United States Patent
Demele et al.

(10) Patent No.: US 10,089,666 B2
(45) Date of Patent: Oct. 2, 2018

(54) MULTI-SOURCE CONFIGURATOR CONTENT PROCESSING FOR TERMS AND CONDITIONS DOCUMENT TO CONTRACT CREATION

(71) Applicant: Oracle International Corporation, Redwood Shores, CA (US)

(72) Inventors: Michael Demele, Los Altos, CA (US); Jillian Hartnell, Granite Bay, CA (US); Rachel Kruzner, Pleasanton, CA (US); Therese Gorman, Rio Rancho, NM (US)

(73) Assignee: Oracle International Corporation, Redwood Shores, CA (US)

( * ) Notice: Subject to any disclaimer, the term of this patent is extended or adjusted under 35 U.S.C. 154(b) by 809 days.

(21) Appl. No.: 14/038,547

(22) Filed: Sep. 26, 2013

(65) Prior Publication Data
US 2014/0095338 A1    Apr. 3, 2014

Related U.S. Application Data

(60) Provisional application No. 61/707,088, filed on Sep. 28, 2012.

(51) Int. Cl.
*G06Q 30/00*    (2012.01)
*G06Q 30/06*    (2012.01)

(52) U.S. Cl.
CPC ......... *G06Q 30/0611* (2013.01); *G06Q 30/06* (2013.01)

(58) Field of Classification Search
CPC ........... G06Q 30/0601–30/0645; G06Q 30/08; G06Q 30/06; G06Q 30/0611
(Continued)

(56) References Cited

U.S. PATENT DOCUMENTS 7,689,435 B2    3/2010    Cohen et al.
7,853,482 B2    12/2010   Kiefer et al.
(Continued)

FOREIGN PATENT DOCUMENTS

EP    1488358       12/2004
KR    20020069663   9/2002

OTHER PUBLICATIONS

Al Tuttle, "e-purchasing: A two-way street", Sep. 2001, Industrial Distribution; Rockaway, vol. 90, Iss. 9, 37-41 (Year: 2001).*
(Continued)

*Primary Examiner* — Ethan D Civan
(74) *Attorney, Agent, or Firm* — Kilpatrick Townsend & Stockton LLP

(57) ABSTRACT

An authored contract document can be created based on an existing RFx sourcing document such as a "terms and conditions" document. This RFx sourcing document can be the product of collaboration and editing by unrelated bidders, thus creating bidder-specific RFx documents. The authored contract document can be created using a rules-based multi-source configurator. This multi-source configurator can include in or exclude from the authored contract document clauses or edits that have been made to the RFx document. The multi-source configurator can replace text from the RFx document that is not typically found in or relevant to an authored contract document with contract-specific text that is not typically found in or relevant to an RFx document. The multi-source configurator can add, to the authored contract document, contract-specific text that is not contained within the RFx document.

17 Claims, 5 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 8,027,885 B2 | 9/2011 | Kiefer et al. | |
| 8,086,518 B1 | 12/2011 | Maor | |
| 8,682,703 B2 | 3/2014 | Britton et al. | |
| 9,501,801 B2 | 11/2016 | Sako et al. | |
| 2002/0007324 A1* | 1/2002 | Centner | G06Q 30/02 705/80 |
| 2002/0072987 A1 | 6/2002 | Knudsen et al. | |
| 2003/0014326 A1 | 1/2003 | Ben-meir et al. | |
| 2005/0055299 A1 | 3/2005 | Chambers et al. | |
| 2006/0174114 A1* | 8/2006 | Rosbury | G06Q 10/00 713/168 |
| 2006/0287966 A1* | 12/2006 | Srinivasaraghavan | G06Q 50/188 705/80 |

OTHER PUBLICATIONS

A Robust and Flexible E-Auction, RFI and RFP Management Solution, Available online at: http://www.combinenet.com/products/esourcing-product/rfxcreation.php, 2000, 1 page.

Contract Creation, Available online at: http://help.sap.com/saphelp_srm70/helpdata/en/7d/889fde3f234bd0999faba8bd3af75a/content.htm, Retreived on Nov. 7, 2012, 1 page.

IBM Emptoris Contract Management, Available online at: http://www.emptoris.com/products-and-services/products/enterprise-contract-management, 1999, 2 pages.

Integrating UpsideContract with UpsideRFX Closes the Loop on Strategic Sourcing, Available online at: http://www.upsidesoft.com/UpsideSoftware/PDF/BP-IntegrateRFX.pdf, Nov. 2004, 2 pages.

Making Sourcing Truly Strategic: Drive Bottom-line Profits by Selecting the Ideal Supplier Base, Available online at: http://www.oracle.com/us/media/ebook/e-srm-wp-strategicsource-0605-195339.pdf, Mar. 2002, 13 pages.

What is an RFX?, Available online at:http://podium.adquira.com/Sourcing/ariba/resource/en/help/content/trader/auction.htm, 1996, 1 page.

* cited by examiner

MULTI-SOURCE CONFIGURATOR CONTENT PROCESSING FOR TERMS AND CONDITIONS DOCUMENT TO CONTRACT CREATION

CLAIM OF PRIORITY

The present application claims priority under 35 U.S.C. § 119 to U.S. Provisional Patent Application Ser. No. 61/707,088; titled "MULTI-SOURCE CONFIGURATOR CONTENT PROCESSING FOR TERMS AND CONDITIONS DOCUMENT TO CONTRACT CREATION"; filed on Sep. 28, 2012; and the entire contents of which are incorporated by reference herein.

BACKGROUND

The discussion below relates generally to the field of enterprise resource planning (ERP) software. ERP software is business management software that allows an organization to use a system of integrated applications to manage business. ERP software can integrate all facets of an operation, including development, manufacturing, sales and marketing. ERP software can include many enterprise software modules that are individually purchased, based on what best meets the specific needs and technical capabilities of the organization. Each ERP module can be focused on one area of business processes, such as product development or marketing. Some of the more common ERP modules can include those for product planning, material purchasing, inventory control, distribution, accounting, marketing, finance and human resources (HR). As the ERP methodology has become more popular, software applications have emerged to help business managers implement ERP in other business activities. Applications may incorporate modules for customer relationship management (CRM) and business intelligence. These modules can be presented as a single unified package. A central repository can store all information that is shared by all the various ERP facets in order to smooth the flow of data across the organization.

Oracle's PeopleSoft supplier relationship management is an integrated suite of procurement applications that can reduce supply management costs. PeopleSoft supplier relationship management can reduce spending on goods and services, streamline procure-to-pay processes, and drive policy compliance. PeopleSoft supplier relationship management provides packaged integration of procurement functions with financial management, human capital management, and ERP suites. PeopleSoft supplier relationship management can give customers the flexibility to leverage applications on-demand, on-premises, or in any combination needed to achieve procurement objectives. PeopleSoft supplier relationship management can integrate procurement with HR in order to provide total workforce management of both contingent and full-time workers.

Organizations recognize the importance of strategic procurement practices as a key component of improved profitability. Request-for-quote and request-for-proposal (collectively RFx) activities can focus on finding the best value and lowest total cost supplier rather than just searching for the lowest price. Tools such as online auctions can be used to increase supplier competition and to benefit to organizations across a growing number of industries.

Strategic sourcing refers to the process of determining the best suppliers for needed goods or services, and the conditions under which business is to be awarded to those suppliers. The strategic element of sourcing can come from the ability to apply different methodologies to create the most value in an organization's supply chain. This value can come in the form of pricing, warranty terms, quality, delivery accuracy, or other factors. Strategic sourcing enables an organization to quantify and balance such requirements so that the organization can achieve its specific business objectives.

Using sourcing tools and strategies, organizations can make buying decisions as part of an overall strategy for achieving business goals, with a view toward building long-term relationships with key suppliers. In an era of ever-increasing demands for cost control and higher operational performance, procurement has become a mission-critical operation. A complete solution built on interact-based portal technologies, reverse auction capabilities, and proposal analysis tools can deliver significant value to an organization.

PeopleSoft Strategic Sourcing can enable an organization to efficiently onboard bidders with self-service registration, reduce procurement costs through competitive bidding and reverse auctions, align its purchasing objectives and execution with overall business strategy, automate and control the RFx and auction process both inside and outside the enterprise, leverage existing supplier and customer relationships while reaching out to new trading partners, track bidder participation and results effectively, retain its knowledge and strategies in an application for future use and performance analysis, perform award analysis using optimization to help determine optimal awards, plan sourcing activities using planning tools that help track progress, and estimate the total cost of transacting with suppliers beyond just price.

Supplier contract management has become even more overwhelming in the face of new business challenges such as globalization, outsourcing, and increased regulatory pressure. Today, most companies record some financial details about their contracts in their purchasing system, but many still store the actual contract document offline (for example, in a file cabinet) with no connection to the execution and compliance activity. Authoring remains a manual process lacking many if any controls. Terms negotiations can be cumbersome and time-consuming, and incomplete adoption and lackluster enforcement can prevent even the best-negotiated contracts from realizing expected savings.

DETAILED DESCRIPTION

In the following description, for the purposes of explanation, specific details are set forth in order to provide a thorough understanding of embodiments of the invention. However, it will be apparent that the invention may be practiced without these specific details.

Overview

According to one embodiment of the invention, an authored contract document can be created in an automated manner based at least in part on an existing RFx sourcing document such as a "terms and conditions" document. This RFx sourcing document can be the product of collaboration and editing by various separate parties, such as unrelated bidders. The processing involved in creating the contract document can use a rules-based multi-source configurator. This multi-source configurator can provide the capability to include in the contract document, or exclude from the contract document, clauses and/or edits that have been made to the RFx document based upon which the contract document is to be generated automatically. The multi-source configurator can additionally or alternatively provide the capability to replace (a) certain text from the RFx document that is not typically found in or relevant to a contract document with (b) contract-specific text that is not typically found in or relevant to an RFx document. The multi-source configurator can additionally or alternatively add, to the contract document, contract-specific text that is not contained within the RFx document. Automatically generating the contract document from the RFx document can reduce the opportunities for errors or inconsistencies to be introduced into the contract document during contact creation.

Template-Enhanced Bidding

Discussion shall begin with an embodiment of the invention involving automatic contract generation based on a collaboratively produced RFx document. In one embodiment, a multi-source configurator can be a template that contains rules. These rules can enable text, such as terms and conditions, to be pulled from a contract library. These rules can assemble text into a Microsoft Word document contract file. This assembly can involve the assembly of text marked up with XML tags. Each item of information within the document can be associated with a unique identifier. These identifiers can be carried within the document perpetually. Contract authoring can be automated based on strategic sourcing events, such as event that occur during a quoting process. During a transactional event, multiple bidders can be requested. The bidders can review an RFx document and respond with various bids. The bids can be evaluated as part of strategic sourcing. Based on this evaluation, the pool of bidders can be narrowed down. Eventually, one or more bids can be accepted. A contract or purchase order can be awarded to the bidders whose bids were accepted. According to an embodiment of the invention, authoring capabilities can be added to the bidding process.

Collaborative Content Processing

Figure 1A:
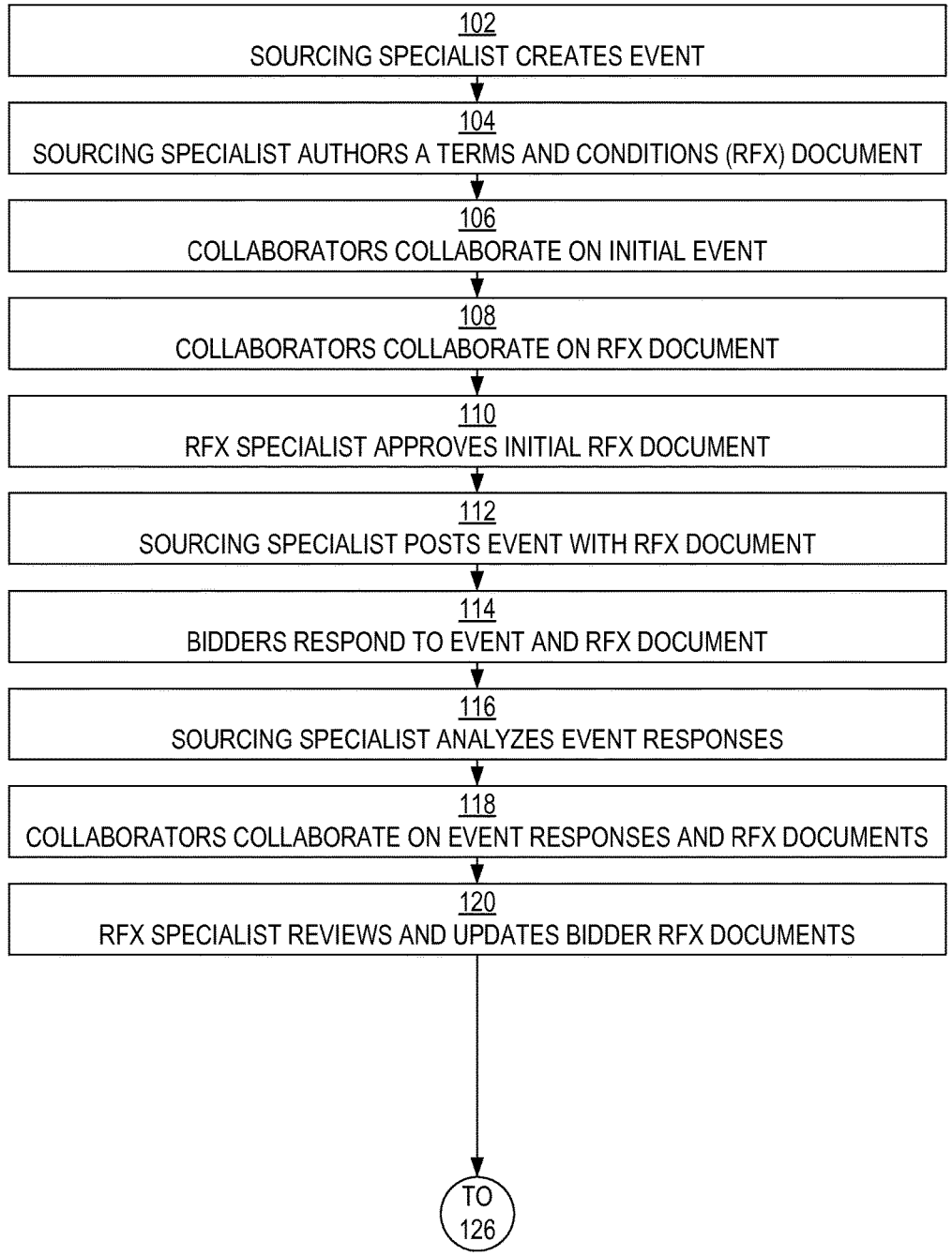
FIGS. 1A-C are flow diagrams that illustrate a technique tier processing content in a collaborative manner, according to an embodiment of the invention.
Figure 1B:
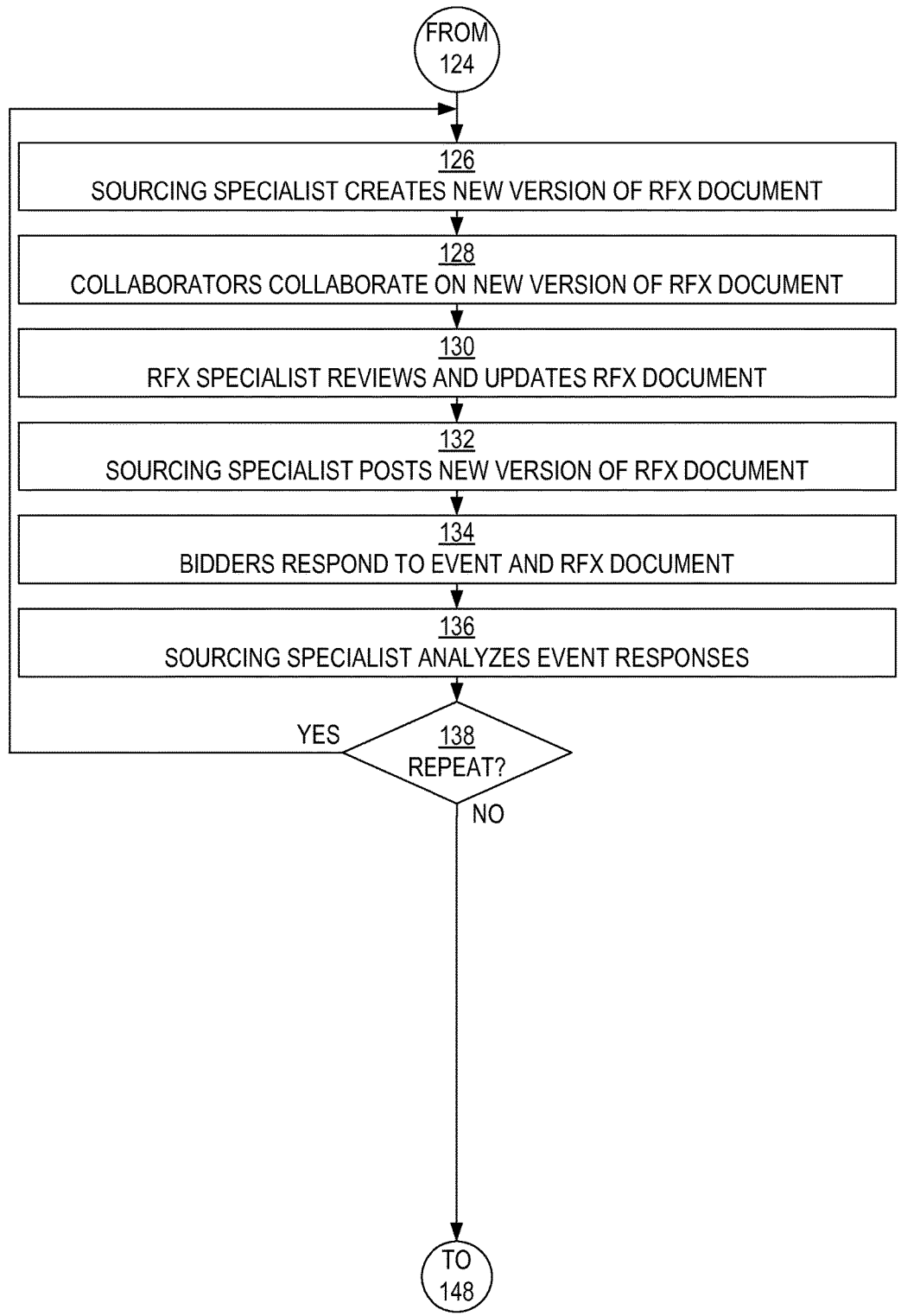
Figure 1C:
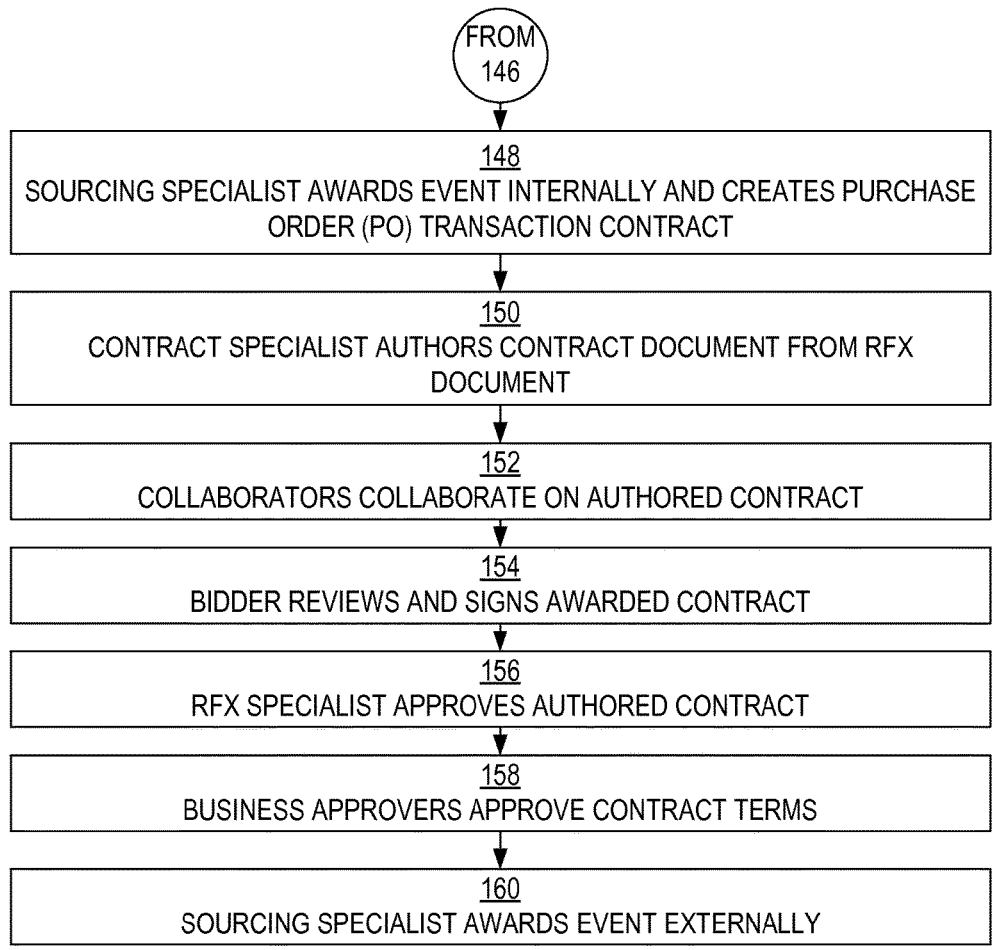

A "terms and conditions" document, which is one kind of RFx document, is created during a sourcing process. Such a document can contain content that is highly similar to at least some of the content that eventually will be included within an awarded procurement contract once the sourcing process has been completed. During the sourcing process, many alterations can be made to bids. Some text from the RFx document might not need to be carried forward into the authored contract document, while other text ought to be carried forward into the authored contract document. According to an embodiment of the invention, a multi-source rules-based configurator can be used in order to create the authored contract document automatically based upon the RFx (e.g., "terms and conditions") document created during the sourcing process. The multi-source configurator can be a single template that is associated with rule-specifying metadata. This configurator can be shared across multiple sources, such as the RFx document and the authored contract document. In an embodiment, the rules associated with (and in one embodiment contained within) the configurator can control the creation and updating of XML-based terms and conditions within the final authored contract document. FIGS. 1A-C are flow diagrams that illustrate a technique for processing content in a collaborative manner, according to an embodiment of the invention. Various different parties can be involved in the performance of the technique, including, for example, a sourcing specialist, multiple collaborators, an RFx specialist, bidders, a contract specialist, business approvers, etc.

The technique begins with block 102 of FIG. 1A. In block 102, a sourcing specialist can create an event. An event can be the creation of or a modification to a document such as an RFx document, for example. In block 104, the sourcing specialist can authors "terms and conditions" document, which is one kind of RFx document. In block 106, multiple collaborators can collaborate on the initial event. In block 108, the multiple collaborators can collaborate on the RFx document. In block 110, an RFx specialist can approve the initial RFx document. In block 112, the sourcing specialist can post an event within the RFx document. Thus, in an embodiment of the invention, during event creation, the RFx document can be authored and collaborated upon by multiple collaborators. Authoring can be integrated throughout the process discussed in relation to FIGS. 1A-C, and prior to actual final authored contract document creation.

Multiple iterations of a cycle can occur as a part of strategic sourcing. In this cycle, a transactional event can be posted to a portal for bidders to review. An authored RFx document can be involved in such a posting and review. In block 114, bidders can respond to the event and the RFx document. The bidders can collaborate upon the RFx document. The bidders can revise the RFx document. In an embodiment, multiple different versions of the RFx document (e.g., a separate version for each bidder) can be created in the process.

In block 116, the sourcing specialist can analyze the event responses. In block 118, the collaborators can collaborate on the event responses and the RFx documents. In block 120, an RFx specialist can review and update bidder RFx documents. The technique proceeds to block 126 of FIG. 1B.

Referring now to FIG. 1B, in block 126, the sourcing specialist can optionally create a new version of the RFx document. In block 128, the multiple collaborators can collaborate on the new version of the RFx document. In block 130, the RFx specialist can review and update the RFx document.

In block 132, the sourcing specialist can post a new version of the RFx document. In block 134, bidders can respond to the event and the RFx document. In block 136, the sourcing specialist can analyze the event responses. In block 136, a determination is made as to whether the process should be repeated. If the determination is that the process should be repeated, then control passes back to block 126. Otherwise, control passes to block 148 of FIG. 1C.

Based on bids from the bidders and the edits that the bidders have made to the RFx document, a contract can be awarded to one or more of the bidders. The RFx document can be involved within the contract award process. Such a contract may be a purchase order, for example, which is essentially a unilateral contract. Referring now to FIG. 1C, in block 148, the sourcing specialist awards an event internally and creates an authored contract document which can be, for example, a purchase order (PO) transaction contract. In block 150, a contract specialist authors an authored contract document from the RFx document. In an embodiment, a separate authored contract document can be constructed automatically for each separate RFx document edited by a particular bidder that has received an award, thereby creating separate authored contract documents for separate awarded bidders. During previous transactions, certain terms and conditions might have been agreed upon during the sourcing process. The creation of the authored contract document can be at least partially automated based upon the "upstream" RFx document(s) that potentially contain red-line edits from the bidders. In an embodiment, the multi-source configurator can take certain contents from the RFx document(s) and place those contents within the authored contract document(s). The selection of the contents to be taken from the RFx document(s) can be based on the rules associated with the configurator. Depending on the rules, some red-lined potions of the RFx document(s) can be carried forward into the authored contract document(s), so that bidder edits remain apparent within the authored contract document(s). This automatic carrying-forward of such edits can be preferable to the manual re-creation of such edits within an authored contract document, since the latter approach can be prone to error. Also depending on the rules, certain sections (potentially delimited by XML tags) from the RFx document(s) can be added to, changed, or deleted from the authored contract document(s). This pulling of content from the RFx document(s) into the authored contract document(s) can involve the usage of bind variable information from the authored contract document(s). In block 152, the multiple collaborators collaborate on the authored contract document. In block 154, the bidder reviews and signs the awarded contract. In block 156, the RFx specialist approves the authored contract document. In block 158, business approvers approve the contract terms. In block 160, the sourcing specialist awards the contract externally.

Rules-Based Automatic Authored Contract Document Generation

In an embodiment, the RFx document can be a Microsoft Word document. Microsoft Word provides a feature called "content controls." Sections of the RFx document to which content controls are applicable can be designated visually by a blue box bounding those sections. Such content controls can be "wrapped around" various terms or sections of the RFx document. Metadata pertaining to each content control can be maintained. The metadata pertaining to a particular content control can specify, among other information, the source from which the text "wrapped" by the particular content control came.

An RFx document can contain red-lined text that reflects an edit that has been made from the original (or previous) version of the RFx document. A bidder or sourcing agent can make such edits as a part of the collaborative process discussed above.

The RFx document might contain some undesirable terms that may be red-line edits. These undesirable terms might be omitted from authored contract document intentionally. The RFx document might contain some quote-specific terms, such as a quote deadline. Such quote-specific terms might not be relevant to the final authored contract document. The RFx document also might contain some bidder-made red-line edits that ought to be propagated and preserved within the final authored contract document. The bidding process might cause any or all of such types of features to become present within the RFx document.

Various operations can be performed relative to the RFx document during the automated generation of an authored contract document based upon that RFx document. In an embodiment, automatic authored contract document creation can be performed in response to a user's activation of a single "create contract" button control element, with reference to the RFx document, in a graphical user interface. In response to such activation, a computer process may notify the user that an RFx document usable for the creation of the authored contract document exists, and may ask the user whether the user wants that RFx document to be used in the automatic creation of the authored contract document. If the user responds affirmatively, then the computer process can apply, to the RFx document, the rules that are associated with the multi-source configurator; the RFx document can be a document that was created using the configurator template. As part of the application of the rules, for example, an introductory section of the RFx document might be automatically replaced with alternative text that is more appropriate for an authored contract document. For another example, as part of the application of the rules, undesirable red-line edits may be removed from certain portions of the RFx document that are propagated to the authored contract document. For yet another example, as part of the application of the rules, desirable red-line edits may be preserved within certain portions of the RFx document that are propagated to the authored contract document.

Multi-Source Configurator Definition

As is discussed above, a multi-source configurator can be a template that is associated with rules that can be applied to an RFx document in order to generate an authored contract document automatically. In an embodiment, a computer process provides a user interface through which a user can define the multi-source configurator. The user interface can specify a list of sources to which the multi-source configurator is to be applicable. For each source in the list, the user interface can contain a checkbox that allows the user to select whether that source is applicable. Such sources may include, for example, ad-hoc sources, a purchasing contract, a purchase order, and/or a sourcing event. In an embodiment, the multi-source configurator is a template that is applicable to multiple separate but potentially related documents, such as an RFx document and an authored contract document to be generated based on that RFx document.

The configurator definition user interface can also provide a mechanism through which the configurator's rules can be defined. The user interface may present a list of the configurator's rules. As is discussed above, various different sections of a document (such as an RFx document) can be "wrapped" by content controls that are each associated with unique identifiers. Each particular rule in the list of rules can specify such an identifier to which that particular rule pertains. A rule can specify whether text contained in the section having that identifier is to be propagated to the authored contract document. A rule can specify whether red-line edits within text contained in the section having that identifier are to be preserved or omitted when that text is propagated to the authored contract document. Each of these rules can be customized by the user who interacts with the user interface to define the multi-source configurator. In an embodiment, each rule can be associated with a structured query language (SQL) query that can be executed against data in a database in order to determine whether that content is to be included within the authored contract document being automatically generated. A rule can involve an evaluation of a specified condition, such as whether the source of a particular section having the specified identifier is a specified type of source (e.g., an ad-hoc source); in an embodiment, the rule is only applied if the specified condition is satisfied.

In addition to rules, the configurator definition user interface can display a list of clauses that identify, by their unique identifiers, sections of the RFx document that are always to be propagated into the authored contract document. In an embodiment, the user who interacts with the user interface to define the multi-source configurator can define and add such clauses to the list of clauses. During authored contract document generation, all sections of the RFx document having unique identifiers that are associated with clauses in the multi-source configurator can be propagated to the authored contract document.

For each rule and clause shown in the configurator definition user interface, the user interface may present an associated outline position. Such outline positions can be the same for all documents that are based on the multi-source configurator. These outline positions can correspond to headers, sections, articles, etc., in the documents based upon the configurator, and can be hierarchically organized relative to each other.

In an embodiment, an RFx document that specifies items that indicate terms and conditions can be presented over a computer network to two or more bidders. From each of the bidders, edits to the items can be received over the network. For each bidder, edits from that bidder can be incorporated into a version of the RFx document specific to that bidder. User input that selects (as awards) certain ones of the bidder's RFx documents can be received by a computing device. A separate purchase order contract can be automatically generated by the computing device for each of the selected bidder's RFx documents. The purchase order contracts can contain items that were modified by the corresponding bidders in the corresponding RFx documents. In an embodiment, the generation of the purchase order contracts can involve applying, to RFx documents, rules from the multi-source configurator's specified set of rules. In an embodiment, each RFx document can contain multiple sections. Each of the bidder-specific RFx documents can also contain these sections. Bidder-produced edits can be dispersed among multiple separate sections. The multi-source configurator's rules can be applied to specific sections to which those rules are mapped. In an embodiment, the application of the rules can involve the application of a rule that preserves, in the authored contract document being generated, bidder-produced edits that are present within an RFx document section to which that rule is specifically mapped. In an embodiment, the application of the rules can involve the application of a rule that replaces all text from an RFx document section to which that rule is specifically mapped with alternative text in the authored contract document being generated. In an embodiment, the application of the rules can involve the application of a rule that adds, to the authored contract document being generated, sections of text that are not contained within the RFx document upon which the authored contract document is based. Each bidder's version of the RFx document can be an instance of that template. Each purchase order contract that is automatically generated based on an awarded bidder's version of the RFx document can also be an instance of that template.

Hardware Overview

Figure 2:
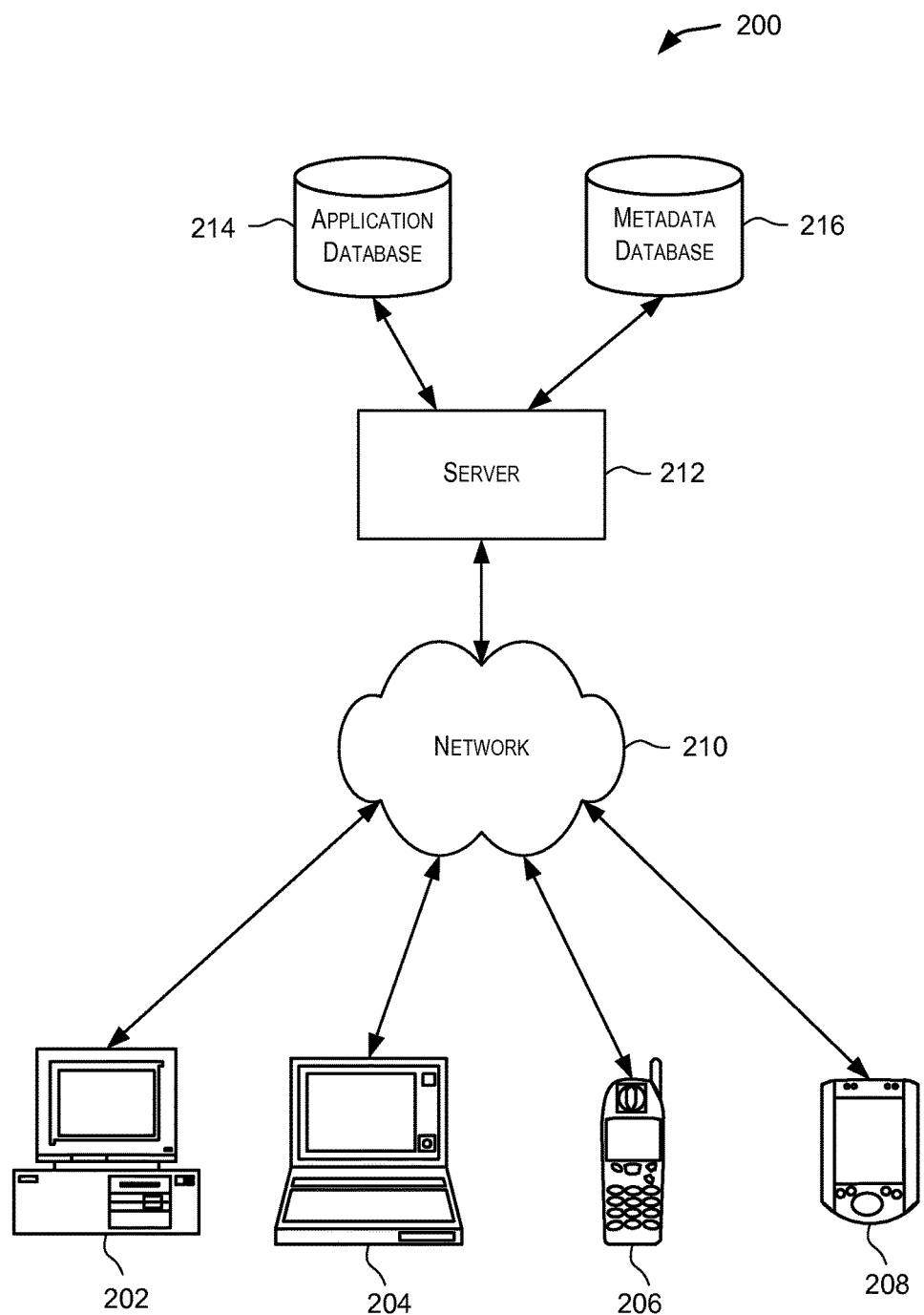
FIG. 2 is a simplified block diagram illustrating components of a system environment that may be used in accordance with an embodiment of the present invention.

FIG. 2 is a simplified block diagram illustrating components of a system environment 100 that may be used in accordance with an embodiment of the present invention. As shown, system environment 200 includes one or more client computing devices 202, 204, 206, 208, which are configured to operate client applications including native client applications and possibly other applications such as a web browser, or the like. In various embodiments, client computing devices 202, 204, 206, and 208 may interact with a server 212.

Client computing devices 202, 204, 206, 208 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 202, 204, 206, and 208 may be any other electronic device, such as a thin-client computer, Internet-enabled gaming system, and/or personal messaging device, capable of communicating over a network (e.g., network 210 described below). Although exemplary system environment 200 is shown with four client computing devices, any number of client computing devices may be supported. Other devices such as devices with sensors, etc. may interact with server 212.

System environment 200 may include a network 210. Network 210 may be any type of network familiar to those skilled in the art that can support data communications using any of a variety of commercially-available protocols, including without limitation TCP/IP, SNA, IPX, AppleTalk, and the like. Merely by way of example, network 210 can be a local area network (LAN), such as an Ethernet network, a Token-Ring network and/or the like; a wide-area network; a virtual network, including without limitation a virtual private network (VPN); the Internet; an intranet; extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 200 also includes one or more server computers 212 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 212 may be adapted to run one or more services or software applications.

Server 212 may run an operating system including any of those discussed above, as well as any commercially available server operating system. Server 212 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 200 may also include one or more databases 214, 216. Databases 214, 216 may reside in a variety of locations. By way of example, one or more of databases 214, 216 may reside on a non-transitory storage medium local to (and/or resident in) server 212. Alternatively, databases 214, 216 may be remote from server 212, and in communication with server 212 via a network-based or dedicated connection. In one set of embodiments, databases 214, 216 may reside in a storage-area network (SAN) familiar to those skilled in the art. Similarly, any necessary files for performing the functions attributed to server 212 may be stored locally on server 212 and/or remotely, as appropriate. In one set of embodiments, databases 214, 216 may include relational databases, such as databases that are provided by Oracle and that are adapted to store, update, and retrieve data in response to SQL-formatted commands.

Figure 3:
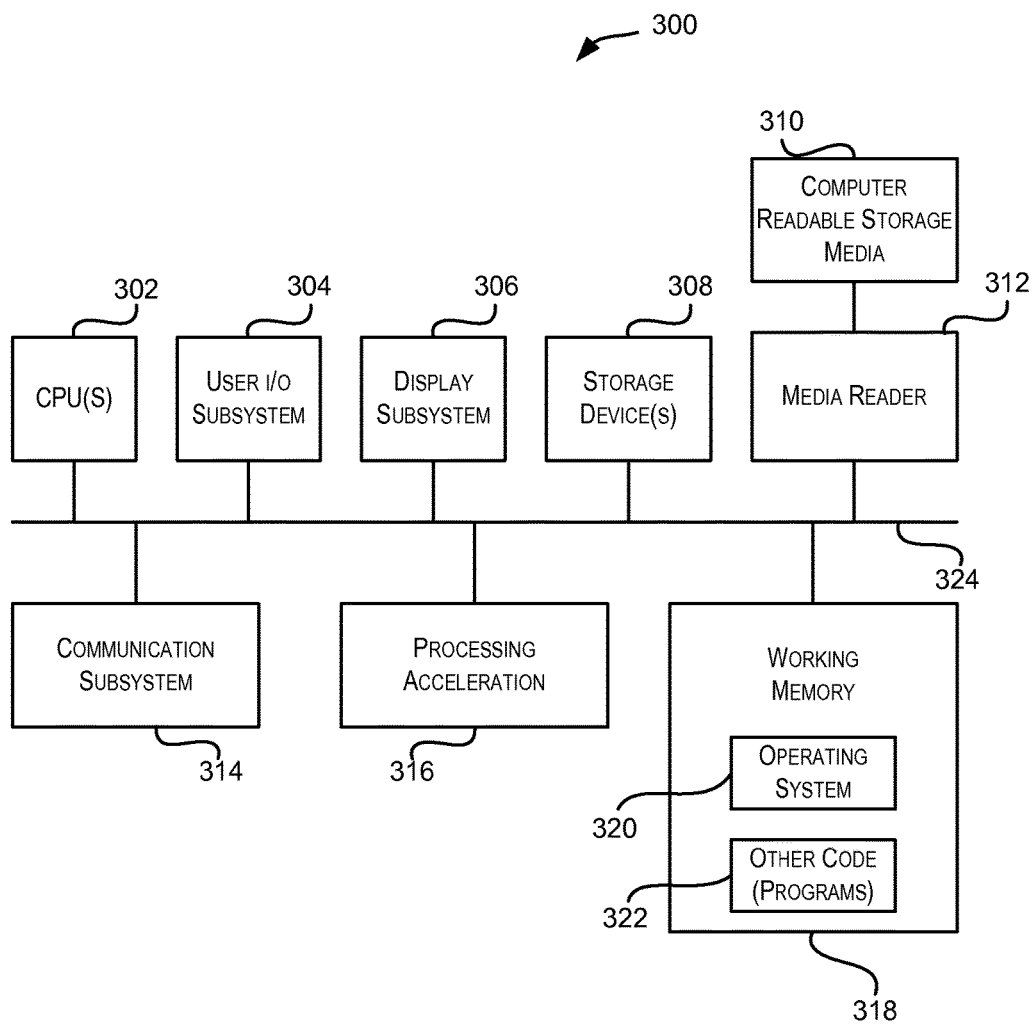
FIG. 3 is a simplified block diagram of a computer system that nay be used in accordance with embodiments of the present invention.

FIG. 3 is a simplified block diagram of a computer system 300 that may be used in accordance with embodiments of the present invention. For example server 212 or clients 202, 204, 206, or 208 may be implemented using a system such as system 300. Computer system 300 is shown comprising hardware elements that may be electrically coupled via a bus 324. The hardware elements may include one or more central processing units (CPUs) 302, one or more input devices 304 (e.g., a mouse, a keyboard, etc.), and one or more output devices 306 (e.g., a display device, a printer, etc.). Computer system 300 may also include one or more storage devices 308. By way of example, the storage device(s) 308 may include devices such as disk drives, optical storage devices, and solid-state storage devices such as a random access memory (RAM) and/or a read-only memory (ROM), which can be programmable, flash-updateabie and/or the like.

Computer system 300 may additionally include a computer-readable storage media reader 312, a communications subsystem 314 (e.g., a modem, a network card (wireless or wired), an infra-red communication device, etc.), and working memory 318, which may include RAM and ROM devices as described above. In some embodiments, computer system 300 may also include a processing acceleration unit 316, which can include a digital signal processor (DSP), a special-purpose processor, and/or the like.

Computer-readable storage media reader 312 can further be connected to a computer-readable storage medium 310, together (and, optionally, in combination with storage device(s) 308) comprehensively representing remote, local, fixed, and/or removable storage devices plus storage media for temporarily and/or more permanently containing computer-readable information. Communications system 314 may permit data to be exchanged with network 210 and/or any other computer described above with respect to system environment 200.

Computer system 300 may also comprise software elements, shown as being currently located within working memory 318, including an operating system 320 and/or other code 322, such as an application program (which may be a client application, Web browser, mid-tier application, RDBMS, etc.). In an exemplary embodiment, working memory 318 may include executable code and associated data structures used for multi-source configurator content processing as described above. It should be appreciated that alternative embodiments of computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method for improved computer automated document creation, comprising:
    presenting, by a computing device, over one or more computer networks, to a plurality of bidders, a first document that specifies items that indicate terms and conditions;
    receiving, by the computing device, over the one or more computer networks, from each particular bidder of the plurality of bidders, one or more edits to the items specified in the first document;
    generating, by the computing device, a plurality of bidder-specific RFx documents, including a separate bidder-specific RFx document for each particular bidder of the plurality of bidders, wherein each of the bidder-specific RFx documents includes a plurality of different sections, and wherein the bidder-specific RFx document for each particular bidder is generated based on the edits received from the particular bidder;
    determining, by the computing device, that a contract document is to be generated for a subset of bidders including at least two of the plurality of bidders;
    retrieving, by the computing device, a subset of the bidder-specific RFx documents corresponding to the subset of bidders for which contract documents are to be generated; and
    initiating, by the computing device, a computer process configured to execute a multi-source template applicable to a plurality of document sources, wherein the computer process, when executed, is further configured to retrieve a plurality of section-specific document processing rules associated with the multi-source template and corresponding document source conditions for determining whether or not to apply each of the plurality of section-specific document processing rules, and
    wherein the computer process, when executed, is configured to perform, for each particular bidder-specific RFx document within the subset of the bidder-specific RFx documents:
        determining a document source of the particular bidder-specific RFx document;
        determining one or more of the section-specific document processing rules associated with the multi-source template to apply to the particular bidder-specific RFx document, wherein said determination is based on a comparison of the document source of the particular bidder-specific RFx document to the corresponding document source conditions of the plurality of section-specific document processing rules associated with the multi-source template;

identifying, by the initiated computer process, one or more sections within the particular bidder-specific RFx document corresponding to the section-specific document processing rules determined for the particular bidder-specific RFx document, wherein the one or more sections are wrapped by content controls each associated with a respective identifier;

applying, by the initiated computer process, the one or more section-specific document processing rules determined for the particular bidder-specific RFx document, to the identified sections of the particular bidder-specific RFx document, wherein the applying is performed by executing a plurality of structure query language queries against a database, wherein at least one structure query language query in the plurality of structure query language queries is associated with an evaluation of whether a source of a particular section having a specified identifier is a specific type of source; and generating, by the initiated computer process, an electronic contract document corresponding to the particular bidder-specific RFx document, based on the application of the section-specific document processing rules to the identified sections of the particular bidder-specific RFx document.

2. The computer-implemented method of claim 1, wherein the first document comprises two or more sections; wherein each of the plurality of bidder-specific RFx documents comprises the two or more sections; wherein the one or more edits from each particular bidder are dispersed among the two or more sections in each of the plurality of bidder-specific RFx documents; and wherein applying the one or more section-specific document processing rules comprises applying, to each particular section of the two or more sections of each particular bidder-specific RFx document, one or more of the section-specific document processing rules that are mapped to the particular section.

3. The computer-implemented method of claim 2, wherein applying the one or more section-specific document processing rules that are mapped to the particular section comprises applying a rule that preserves, in a particular electronic contract document generated based on a particular bidder-specific RFx document, all bidder-produced edits that are present within the particular section in the particular bidder-specific RFx document.

4. The computer-implemented method of claim 2, wherein applying the one or more section-specific document processing rules that are mapped to the particular section comprises applying a rule that removes, from a particular electronic contract document generated based on a particular bidder-specific RFx document, all bidder-produced edits that are present within the particular section in the particular bidder-specific RFx document.

5. The computer-implemented method of claim 2, wherein applying the one or more section-specific document processing rules that are mapped to the particular section comprises applying a rule that replaces, with alternative text, in a particular electronic contract document generated based on a particular bidder-specific RFx document, all text within the particular section in the particular bidder-specific RFx document.

6. The computer-implemented method of claim 1, wherein the first document is a template that is associated with metadata that specifies the set of section-specific document processing rules; wherein each of the plurality of bidder-specific RFx documents is an instance of the template; and wherein each electronic contract document is an instance of the template.

7. The computer-implemented method of claim 1, wherein generating the separate electronic contract document for each particular bidder-specific RFx document of the plurality of bidder-specific RFx documents comprises applying, to each particular bidder-specific RFx document, one or more rules whose application adds, to a particular electronic contract document generated based on the particular bidder-specific RFx document, one or more sections of text not contained in the particular bidder-specific RFx document.

8. A system for improved computer automated document creation, comprising:
a memory; and
a processor coupled to the memory;
wherein the processor is configured to:
present, to a plurality of bidders, a first document that specifies items that indicate terms and conditions;
receive, from each particular bidder of the plurality of bidders, one or more edits to the items specified in the first document;
generate a plurality of bidder-specific RFx documents, including a separate bidder-specific RFx document for each particular bidder of plurality of bidders, wherein each of the bidder-specific RFx documents includes a plurality of different sections, and wherein the bidder-specific RFx document for each particular bidder is generated based on the edits received from the particular bidder;
determine that a contract document is to be generated for a subset of bidders including at least two of the plurality of bidders;
retrieve a subset of the bidder-specific RFx documents corresponding to the subset of bidders for which contract documents are to be generated; and
initiate a computer process configured to execute a multi-source template applicable to a plurality of document sources, wherein the computer process, when executed, is further configured to retrieve a plurality of section-specific document processing rules associated with the multi-source template and corresponding document source conditions for determining whether or not to apply each of the plurality of section-specific document processing rules, and
wherein the computer process, when executed, is configured to, for each particular bidder-specific RFx document within the subset of the bidder-specific RFx documents:
determine a document source of the particular bidder-specific RFx document;
determine one or more of the section-specific document processing rules associated with the multi-source template to apply to the particular bidder-specific RFx document, wherein said determination is based on a comparison of the document source of the particular bidder-specific RFx document to the corresponding document source conditions of the plurality of section-specific document processing rules associated with the multi-source template;

identify one or more sections within the particular bidder-specific RFx document corresponding to the section-specific document processing rules determined for the particular bidder-specific RFx document, wherein the one or more sections are wrapped by content controls each associated with a respective identifier;

apply the one or more section-specific document processing rules determined for the particular bidder-specific RFx document, to the identified sections of the particular bidder-specific RFx document, wherein the applying is performed by executing a plurality of structure query language queries against a database, wherein at least one structure query language query in the plurality of structure query language queries is associated with an evaluation of whether a source of a particular section having a specified identifier is a specific type of source; and generate an electronic contract document corresponding to the particular bidder-specific RFx document, based on the application of the section-specific document processing rules to the identified sections of the particular bidder-specific RFx document.

9. The system of claim 8, wherein the first document comprises two or more sections; wherein each of the plurality of bidder-specific RFx documents comprises the two or more sections; wherein the one or more edits from each particular bidder are dispersed among the two or more sections in each of the plurality of bidder-specific RFx documents; and wherein applying the one or more section-specific document processing rules comprises applying, to each particular section of the two or more sections of each particular bidder-specific RFx document, one or more of the section-specific document processing rules that are mapped to the particular section.

10. The system of claim 9, wherein the processor is configured to apply the one or more section-specific document processing rules that are mapped to the particular section by applying a rule that preserves, in a particular electronic contract document generated based on a particular bidder-specific RFx document, all bidder-produced edits that are present within the particular section in the particular bidder-specific RFx document.

11. The system of claim 9, wherein the processor is configured to apply the one or more section-specific document processing rules that are mapped to the particular section by applying a rule that removes, from a particular electronic contract document generated based on a particular bidder-specific RFx document, all bidder-produced edits that are present within the particular section in the particular bidder-specific RFx document.

12. The system of claim 9, wherein the processor is configured to apply the one or more section-specific document processing rules that are mapped to the particular section by applying a rule that replaces, with alternative text, in a particular electronic contract document generated based on the particular bidder-specific RFx document, all text within the particular section in the particular bidder-specific RFx document.

13. The system of claim 8, wherein the first document is a template that is associated with metadata that specifies the set of section-specific document processing rules; wherein each of the plurality of bidder-specific RFx documents is an instance of the template; and wherein each electronic contract document is an instance of the template.

14. The system of claim 8, wherein the processor is configured to generate the separate electronic contract document for each particular bidder-specific RFx document of the plurality of bidder-specific RFx documents by applying, to each particular bidder-specific RFx document, one or more rules whose application adds, to a particular electronic contract document generated based on the particular bidder-specific RFx document, one or more sections of text not contained in the particular bidder-specific RFx document.

15. A non-transitory computer-readable storage memory storing a plurality of instructions which, when executed by one or more processors, cause the one or more processors to perform operations for improved computer automated document creation, the operations comprising:

presenting, to a plurality of bidders, a first document that specifies items that indicate terms and conditions;

receiving, from each particular bidder of the plurality of bidders, one or more edits to the items specified in the first document;

generating a plurality of bidder-specific RFx documents, including a separate bidder-specific RFx document for each particular bidder of the plurality of bidders, wherein each of the bidder-specific RFx documents includes a plurality of different sections, and wherein the bidder-specific RFx document for each particular bidder is generated based on the edits received from the particular bidder;

determining that a contract document is to be generated for a subset of bidders including at least two of the plurality of bidders;

retrieving a subset of the bidder-specific RFx documents corresponding to the subset of bidders for which contract documents are to be generated; and initiating a computer process configured to execute a multi-source template applicable to a plurality of document sources, wherein the computer process, when executed, is further configured to retrieve a plurality of section-specific document processing rules associated with the multi-source template and corresponding document source conditions for determining whether or not to apply each of the plurality of section-specific document processing rules, and wherein the computer process, when executed, is configured to perform, for each particular bidder-specific RFx document within the subset of the bidder-specific RFx documents:

determining a document source of the particular bidder-specific RFx document;

determining one or more of the section-specific document processing rules associated with the multi-source template to apply to the particular bidder-specific RFx document, wherein said determination is based on a comparison of the document source of the particular bidder-specific RFx document to the corresponding document source conditions of the plurality of section-specific document processing rules associated with the multi-source template;

identifying one or more sections within the particular bidder-specific RFx document corresponding to the section-specific document processing rules determined for the particular bidder-specific RFx document, wherein the one or more sections are wrapped by content controls each associated with a respective identifier;

applying, by the initiated computer process, the one or more section-specific document processing rules determined for the particular bidder-specific RFx document, to the identified sections of the particular bidder-specific RFx document, wherein the applying is performed by executing a plurality of structure query language queries against a database, wherein at least one structure query language query in the plurality of structure query language queries is associated with an evaluation of whether a source of a particular section having a specified identifier is a specific type of source; and generating, by the initiated computer process, an electronic contract document corresponding to the particular bidder-specific RFx document, based on the application of the section-specific document processing rules to the identified sections of the particular bidder-specific RFx document.

16. The non-transitory computer-readable storage memory of claim 15, wherein the first document comprises two or more sections; wherein each of the plurality of bidder-specific RFx documents comprises the two or more sections; wherein the one or more edits from each particular bidder are dispersed among the two or more sections in each of the plurality of bidder-specific RFx documents; and wherein applying the one or more section-specific document processing rules comprises applying, to each particular section of the two or more sections of each particular bidder-specific RFx document, one or more of the section-specific document processing rules that are mapped to the particular section.

17. The non-transitory computer-readable storage memory of claim 15, wherein applying the one or more section-specific document processing rules that are mapped to the particular section comprises applying a rule that preserves, in a particular electronic contract document generated based on a particular bidder-specific RFx document, all bidder-produced edits that are present within the particular section in the particular bidder-specific RFx document.

* * * * *

UNITED STATES PATENT AND TRADEMARK OFFICE
CERTIFICATE OF CORRECTION

PATENT NO. : 10,089,666 B2
APPLICATION NO. : 14/038547
DATED : October 2, 2018
INVENTOR(S) : Demele et al.

Page 1 of 1

It is certified that error appears in the above-identified patent and that said Letters Patent is hereby corrected as shown below:

In the Specification

Column 2, Line 48, delete "tier" and insert -- for --, therefor.

Column 2, Line 54, delete "nay" and insert -- may --, therefor.

Signed and Sealed this
Thirty-first Day of December, 2019

Andrei Iancu
*Director of the United States Patent and Trademark Office*